July 17, 1928.
W. G. MILNE
1,677,456
POLE TOP FIXTURE FOR TRANSMISSION LINES
Filed May 23, 1927
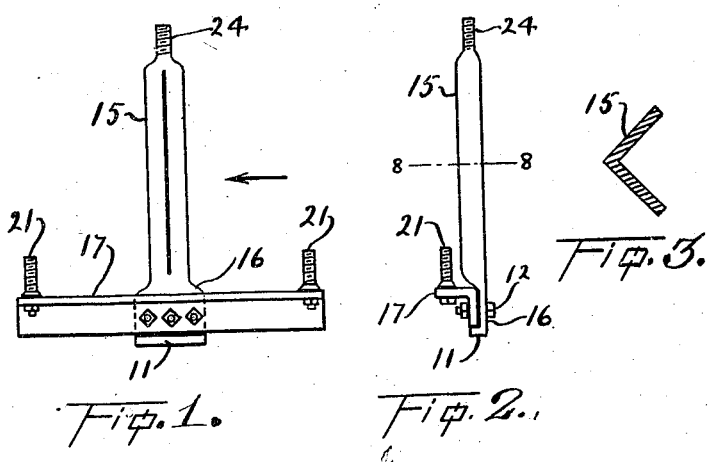
INVENTOR
Winford Gladstone Milne
by Fetherstonhaugh Co
attys.

Patented July 17, 1928.

1,677,456

UNITED STATES PATENT OFFICE.

WINFORD GLADSTONE MILNE, OF HAMILTON, ONTARIO, CANADA, ASSIGNOR TO THE N. SLATER COMPANY, LIMITED, OF HAMILTON, CANADA.

POLE TOP FIXTURE FOR TRANSMISSION LINES.

Application filed May 23, 1927. Serial No. 193,645.

My invention relates to improvements in pole top fixtures for transmission lines and the object of the invention is to devise an improved fixture for supporting transmission lines at the top of a pole which will be of simple and inexpensive construction, which will be very strong and rigid, and which may be readily and conveniently adaptable to a wide range of systems.

Other objects will appear in the course of the following specification.

My invention consists in the construction and arrangement of parts, all as hereinafter more particularly described and illustrated in the accompanying drawings in which:

Fig. 1 is an elevation of a pole top fixture constructed in accordance with my invention.

Fig. 2 is an edge elevation of Fig. 1 looking in the direction of the arrow.

Fig. 3 is a section taken on the line 3—3 of Fig. 2.

In the drawings like characters of reference indicate corresponding parts in the various views.

My improved fixture consists of an upright arm to the lower end of which a transverse arm is connected in a novel manner.

In the construction shown the two arms are of angle section, the upright arm 15 being an angle section having the lower end flattened to form a flange 16 which is in alignment with the edges of the legs of the upright angle bar 15.

The lower extremity of this flange is bent at 11 towards the transverse arm 17.

The transverse arm 17 is also of angle section and is disposed with one leg of the angle lying flat against the flange 16 and the other arm extending perpendicularly therefrom.

In this case the lower bent extremity 11 forms a seat upon which the lower edge of the transverse arm 13 rests.

Also in this case the apex of the upright angle 15 is directed towards the transverse arm 17.

The two arms are secured together at their overlapping portions by bolts 12.

From the foregoing it will be noted that, the transverse arm is disposed angularly with respect to the upright arm and overlaps the upright arm at one end thereof.

Further the upright arm is deformed at the end thereof to form a seat for the transverse arm and the arms are secured together at their overlapping portions.

The construction is such that when secured together the arms form a strong, rigid fixture and the need of diagonal braces is eliminated.

In use, the fixture is secured to the top of a pole and any desired combination of the upright and transverse arms may be used as required to support the particular system of wires used.

If desired the transverse arm may extend on one side only of the upright arm.

Also if desired the upright arm may be used alone without any transverse arm and later the transverse arm may be readily attached when required.

In all cases the mounting is simplified, as once the transverse arm is attached, the deformation of the upright arm with its seat for the transverse arm provides a very rigid mounting of the transverse arm thereon and no rocking of the transverse arm thereon is possible.

Insulator pins would be carried by the transverse arm and by the upper end of the upright arm and these might be of any well known type since the particular form of insulator pin used does not form part of my present invention.

From the foregoing it will be evident that I have devised an improved pole top fixture whereby the objects of my invention have been attained.

What I claim as my invention is:

1. A pole top fixture comprising two superimposed arms overlapping each other and disposed angularly with respect to each other, one of the arms located at the end of the other arm, the latter arm being of angle section with the apex directed towards the former arm, said latter arm flattened at one end to form a flange in alignment with the edges of the legs of the angle, the former arm bearing against said flange, the extremity of the flattened flange bent towards the former arm to form a seat upon which the edge of said former arm rests, and means securing said arms together at their overlapping portions.

2. A pole top fixture comprising two superimposed arms of angle section overlapping each other and disposed angularly with respect to each other, one of the arms located at the end of the other arm, the latter arm positioned with the apex of the angle directed towards the former arm and the former arm positioned with one leg of the angle at right angles to the latter arm, said latter arm flattened at one end to form a flange in alignment with the edges of the legs of said angle, one leg of said former angle bearing against said flange, the extremity of said flange bent towards the former arm to form a seat upon which the edge of said former arm rests, and means securing said arms together at their overlapping portions.

WINFORD GLADSTONE MILNE.